(12) United States Patent
Meng

(10) Patent No.: US 9,413,633 B2
(45) Date of Patent: Aug. 9, 2016

(54) SERVICE PACKET SENDING AND RECEIVING METHOD, APPARATUS, AND SYSTEM

(71) Applicant: Huawei Technologies Co., Ltd., Shenzhen (CN)

(72) Inventor: Yu Meng, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 463 days.

(21) Appl. No.: 13/894,810

(22) Filed: May 15, 2013

(65) Prior Publication Data

US 2013/0250946 A1    Sep. 26, 2013

Related U.S. Application Data

(63) Continuation of application No. PCT/CN2012/071998, filed on Mar. 6, 2012.

(51) Int. Cl.
| | |
|---|---|
| *H04L 12/951* | (2013.01) |
| *H04L 12/701* | (2013.01) |
| *H04L 1/00* | (2006.01) |
| *H04L 1/20* | (2006.01) |

(Continued)

(52) U.S. Cl.
CPC .............. *H04L 45/00* (2013.01); *H04L 1/0003* (2013.01); *H04L 1/0007* (2013.01); *H04L 1/0009* (2013.01); *H04L 1/0086* (2013.01); *H04L 1/205* (2013.01); *H04L 47/2441* (2013.01); *H04L 47/365* (2013.01); *H04L 47/38* (2013.01); *H04L 69/24* (2013.01)

(58) Field of Classification Search
USPC ......................................... 370/252, 395, 389
See application file for complete search history.

(56) References Cited

U.S. PATENT DOCUMENTS 6,097,707 A * 8/2000 Hodzic ............. H04W 74/0891
370/321
2006/0245452 A1   11/2006 Frederiksen et al.
(Continued)

FOREIGN PATENT DOCUMENTS

| CN | 101645927 A | 2/2010 |
|---|---|---|
| CN | 101924702 A | 12/2010 |

(Continued)

OTHER PUBLICATIONS

Bormann, "The Multi-Class Extension to Multi-Link PPP" Network Working Group, Sep. 1999, 12 pages.

(Continued)

*Primary Examiner* — Zewdu A Beyen
(74) *Attorney, Agent, or Firm* — Brinks Gilson & Lione

(57) ABSTRACT

The present disclosure discloses network devices and systems for sending and receiving service packet. The network device is configured to: receive an insensitive service packet; obtain a current slicing length according to a modulation mode of a communication link; perform slicing processing once on the insensitive service packet according to the current slicing length to obtain one slice, and send the slice through the communication link, If the current slicing length is smaller than a length of the insensitive service packet, for the remaining part of the insensitive service packet which has undergone the slicing processing once, the network device repeats the obtaining of the current slicing length, the slicing processing, and the sending the slice, until the insensitive service packet is completely sent.

6 Claims, 7 Drawing Sheets

(51) Int. Cl.
*H04L 12/851* (2013.01)
*H04L 12/805* (2013.01)
*H04L 12/811* (2013.01)
*H04L 29/06* (2006.01)

(56) References Cited

U.S. PATENT DOCUMENTS

2007/0110002 A1* 5/2007 Yang .................. H04L 1/0003
 370/335
2008/0037547 A1* 2/2008 Jang .................. H04L 1/0007
 370/394

FOREIGN PATENT DOCUMENTS

| CN | 101938406 A | 1/2011 |
| CN | 102238064 A | 11/2011 |
| WO | WO 2006/043746 A1 | 4/2006 |

OTHER PUBLICATIONS

Ciccarese et al., "A Packet Size Control Algorithm for IEEE 802.16e" IEEE 2008, 6 pages.

Pan et al., "A Joint Adaptive Subpacket Size and Modulation Coding Scheme with Variable Bandwidth" Global Mobile Congress, 2009, 6 pages.

Sklower et al., "The PPP Multilink Protocol (MP)" Network Working Group, Aug. 1996, 25 pages.

Zhang et al., "Joint AMC and Packet Fragmentation for Error Control Over Fading Channels" IEEE Transactions on Vehicular Technology, vol. 59, No. 6, Jul. 2010, 11 pages.

Cisco Systems, "Reducing Latency and Jitter for Real-Time Traffic Using Multilink PPP" Mar. 21, 2011, 8 pages.

International Search Report and Written Opinion of the International Searching Authority issued in corresponding PCT Patent Application No. PCT/CN2012/071998, mailed Dec. 20, 2012.

* cited by examiner

| Type indication (1 bit) | End indication (1 bit) | Length indication (14 bits) | Type indication (16 bits) |
|---|---|---|---|

FIG. 4

SERVICE PACKET SENDING AND RECEIVING METHOD, APPARATUS, AND SYSTEM

CROSS-REFERENCE TO RELATED APPLICATIONS

This application is a continuation of International Application No. PCT/CN2012/071998, filed on Mar. 6, 2012, which is hereby incorporated by reference in its entirety.

FIELD

The present disclosure relates to the field of network communications technologies, and in particular, to a service packet sending and receiving method, apparatus, and system.

BACKGROUND

Main characteristics of a frame relay network are that an asynchronous multiplexing technology based on a variable-length frame is adopted and a transmission rate of a data service packet is high. When a service packet which is of voice, video and so on and is sensitive to delay time (hereinafter abbreviated as sensitive service packet) and a data service packet are transmitted mixedly, the two kinds of service packets competes. If the data service packet is transmitted preferentially, and the data service packet is relatively long (such as a jumbo frame), the sensitive service packet needs to wait to be sent until the data service packet is completely sent, and waiting time (which is generally 8 ms) cannot be accepted for the sensitive service packet, which leads to a jitter of the sensitive service packet.

In the prior art, a method for reducing a jitter of a sensitive service packet in a frame relay network is put forward: when a sensitive service packet and a data service packet are transmitted mixedly, first slice the data service packet, that is, divide the data service packet into multiple segments according to a specified length, and then, enable the sensitive service packet to compete with slices. Because a length of a slice is relatively short, even if the slice is transmitted preferentially, waiting time of the sensitive service packet is also greatly shortened, thereby achieving an objective of reducing the jitter of the sensitive service packet.

However, in the foregoing method for reducing the jitter of the sensitive service packet, multilink point-to-point protocol (MLPPP) encapsulation needs to be performed on each slice of the data service packet before each slice of the data service packet is sent, so that an 11-byte encapsulation overhead is averagely increased for each slice; when the data service packet is transmitted through a physical port on a sending/receiving apparatus, a bandwidth utilization rate of a communication link is significantly decreased, which causes that the method for reducing the jitter of the sensitive service packet cannot be used in the microwave communication field which has a relatively high requirement for the bandwidth utilization rate.

SUMMARY

Embodiments of the present disclosure provide a service packet sending and receiving method, apparatus, and system, which can improve a bandwidth utilization rate of a communication link on a precondition that a jitter of a sensitive service packet is reduced.

To achieve the foregoing objective, the embodiments of the present disclosure adopt the following solutions:

A service packet sending method implemented in a network device includes: receiving an insensitive service packet; obtaining a current slicing length according to a modulation mode of a communication link, where the modulation mode of the communication link reflects transmission quality of a current packet and is determined by an adaptive coding and modulation engine; performing slicing processing once on the insensitive service packet according to the current slicing length to obtain one slice, and sending the slice through the communication link; and if the current slicing length is smaller than a length of the insensitive service packet, for a remaining part of the insensitive service packet which has undergone the slicing processing once, repeating the step of obtaining the current slicing length, the step of slicing processing, and the step of sending the slice, until the insensitive service packet is completely sent.

A service packet receiving method implemented in a network device includes: receiving a slice, where the slice is formed after a sending apparatus performs slicing processing on an insensitive service packet according to a current slicing length, the current slicing length is obtained by the sending apparatus according to a modulation mode of a communication link, and the modulation mode of the communication link reflects transmission quality of a current packet and is determined by an adaptive coding and modulation engine; determining that the slice is not the last slice of all slices of the insensitive service packet, obtaining the current slicing length according to the modulation mode, and performing length checking on the slice according to the current slicing length; and if a result of the length checking is correct, for a slice which is not received and is in all slices of the insensitive service packet, repeating the step of receiving the slice, the step of obtaining the current slicing length, and the step of length checking, until all the slices are received.

A network device includes: a receiving unit, configured to receive an insensitive service packet; a slicing length obtaining unit, configured to obtain a current slicing length according to a modulation mode of a communication link, where the modulation mode of the communication link reflects transmission quality of a current packet and is determined by an adaptive coding and modulation engine; a slicing unit, configured to perform slicing processing once on the insensitive service packet according to the current slicing length to obtain one slice; a sending unit, configured to send the slice through the communication link; a determining unit, configured to determine whether the current slicing length is smaller than a length of the insensitive service packet; and a cycling unit, configured to: when it is determined that the current slicing length is smaller than the length of the insensitive service packet, sequentially send a remaining part of the insensitive service packet which has undergone the slicing processing once in the slicing unit to the slicing length obtaining unit, the slicing unit, and the sending unit, to repeat the step of obtaining the current slicing length, the step of slicing processing, and the step of sending the slice, until the insensitive service packet is completely sent.

A network device includes: a receiving unit, configured to receive a slice, where the slice is formed after a sending apparatus performs slicing processing on an insensitive service packet according to a current slicing length, the current slicing length is obtained by the sending apparatus according to a modulation mode of a communication link, and the modulation mode of the communication link reflects transmission quality of a current packet and is determined by an adaptive coding and modulation engine; a slicing length obtaining unit, configured to determine that the slice is not the last slice of all slices of the insensitive service packet, and obtain the current slicing length according to the modulation mode; a checking unit, configured to perform length checking on the slice according to the current slicing length; and a cycling unit, configured to: when a result of the length checking is correct, for a slice which is not received and is in all slices of the insensitive service packet, sequentially trigger the receiving unit, the slicing length obtaining unit, and the checking unit, to repeat the step of receiving the slice, the step of obtaining the current slicing length, and the step of length checking, until all the slices are received.

A service packet transmission system includes: a sending apparatus, a receiving apparatus, and an adaptive coding and modulation engine; where the adaptive coding and modulation engine is configured to: determine a modulation mode of the communication link according to current state information of a communication link, where the modulation mode of the communication link reflects transmission quality of a current packet; the sending apparatus is configured to receive an insensitive service packet, obtain a current slicing length according to the modulation mode determined by the adaptive coding and modulation engine, perform slicing processing once on the insensitive service packet according to the current slicing length to obtain one slice, and send the slice through the communication link; and if the current slicing length is smaller than a length of the insensitive service packet, for a remaining part of the insensitive service packet which has undergone the slicing processing once, repeat the step of obtaining the current slicing length, the step of slicing processing, and the step of sending the slice, until the insensitive service packet is completely sent; and the receiving apparatus is configured to receive the slice, determine that the slice is not the last slice of all slices of the insensitive service packet, obtain the current slicing length according to the modulation mode determined by the adaptive coding and modulation engine, and perform length checking on the slice according to the current slicing length; and if a result of the length checking is correct, for a slice which is not received and is in all slices of the insensitive service packet, repeat the step of receiving the slice, the step of obtaining the current slicing length, and the step of length checking, until all the slices are received.

In the service packet sending and receiving method, apparatus, and system which are provided in the embodiments of the present disclosure, a method for slicing the insensitive service packet and then sending the insensitive service packet is adopted, and therefore, when the insensitive service packet and the sensitive service packet are mixedly sent, the jitter of the sensitive service packet can be reduced; when the insensitive service packet is sliced, every time before slicing processing is performed, the modulation mode of the communication link is first obtained, where the modulation mode of the communication link reflects the transmission quality of the current packet and is determined by the adaptive coding and modulation engine, and then the current slicing length is obtained through calculation according to the modulation mode of the communication link, to perform slicing processing on the insensitive service packet according to the current slicing length, thereby ensuring that the service packet is transmitted to a greatest extent, so that the bandwidth utilization rate of the communication link is improved on a precondition that it is ensured to reduce the jitter of the sensitive service packet.

BRIEF DESCRIPTION OF THE DRAWINGS

To illustrate the solutions in the embodiments of the present disclosure more clearly, the following briefly introduces the accompanying drawings needed for describing the embodiments. Apparently, the accompanying drawings in the following description show merely some embodiments of the present disclosure, and persons of ordinary skill in the art may still derive other drawings from the accompanying drawings without making creative efforts.

FIG. 4 is a schematic structural diagram of a header indication used to perform link layer encapsulation on a slice according to Embodiment 3 of the present disclosure;

DETAILED DESCRIPTION OF THE EMBODIMENTS

The following clearly describes the solutions in the embodiments of the present disclosure with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without making creative effects shall fall within the protection scope of the present disclosure.

An insensitive service packet described in the following embodiments of the present disclosure refers to all packets in a communication network except a sensitive service packet which is sensitive to delay time.

Embodiment 1

Figure 1:
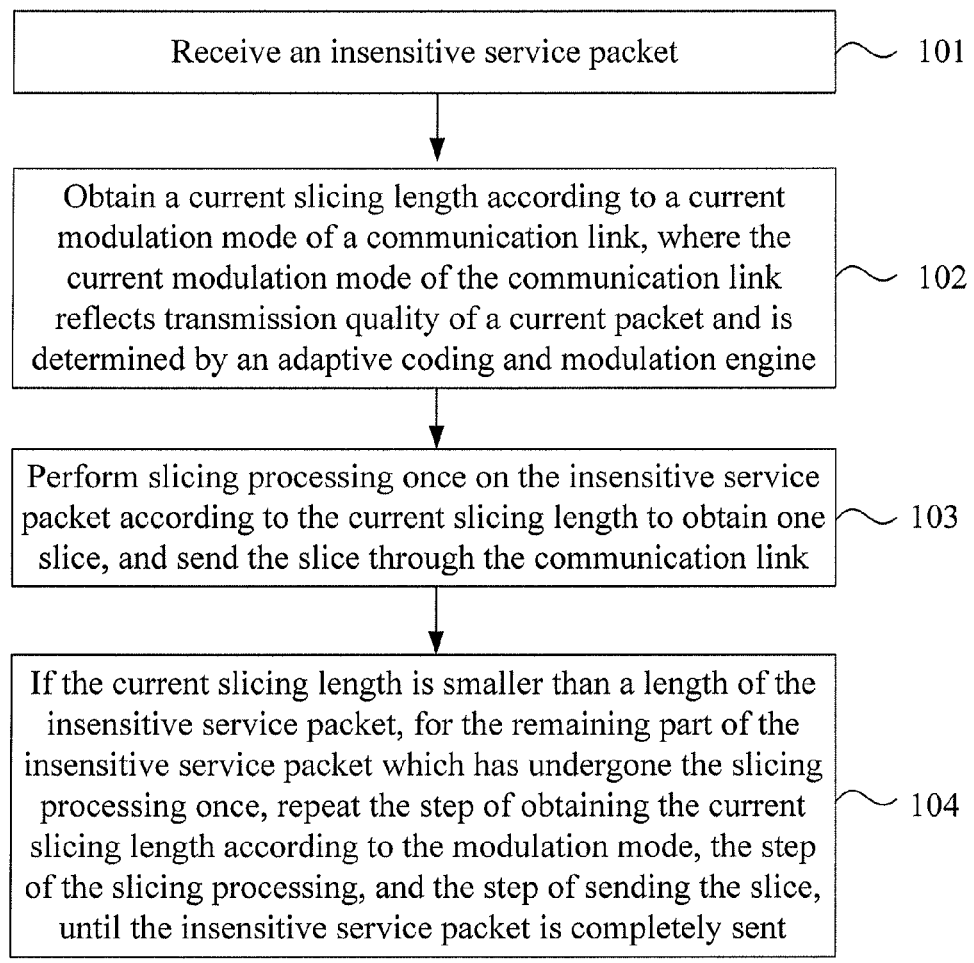
FIG. 1 is a flow chart of a service packet sending method according to Embodiment 1 of the present disclosure.

This embodiment provides a service packet sending method. A subject executing the method is a sending apparatus which has a packet sending function and is in a communication network, and the sending apparatus includes a network communication device (such as a layer 2 switch) which is capable of running a data link layer protocol. As shown in FIG. 1, the method includes the following steps.

101. Receive an insensitive service packet.

For example, the sending apparatus receives the insensitive service packet, and the packet needs to be sent through the sending apparatus to a receiving apparatus. To prevent jitter influence which is on a sensitive service packet and is caused by sending the insensitive service packet, a subsequent step of slicing processing needs to be performed on the insensitive service packet, and then a slice is sent to the insensitive service packet receiving apparatus through a physical port of the sending apparatus via a communication link.

102. Obtain a current slicing length according to a modulation mode of the communication link, where the modulation mode of the communication link reflects transmission quality of a current packet and is determined by an adaptive coding and modulation engine.

For example, a communication link in a mobile communication system is a multipath fading and randomly time-varying channel, and its channel state information keeps changing. The changing state information may cause a serious error burst, and one of methods for solving channel quality fluctuation is to adopt an adaptive coding and modulation (Adaptive Coding and Modulation, abbreviated as: AMC) technology. The essence of the AMC technology is: determining capacity of a current channel according to channel state information, and determining a proper coding and modulation mode and so on according to the capacity, so as to send data to a greatest extent and realize a relatively high rate.

An apparatus which utilizes the AMC technology to perform dynamic adjustment on the modulation mode of the communication link is referred to as an AMC engine. Channel state information may be decided according to signal-to-noise ratio measurement of a channel or according to another similar measurement result, and then the AMC engine determines a corresponding coding and modulation mode according to the channel state information.

In this step, before slicing processing is performed on the insensitive service packet, a slicing length is first determined. Different from the prior art in which a fixed slicing length is used, this embodiment adopts a manner of obtaining the slicing length in real time, that is, obtaining the current slicing length according to the modulation mode of the communication link, where the modulation mode of the communication link reflects the transmission quality of the current packet and is determined by the adaptive coding and modulation engine, to ensure that the service packet is transmitted to a greatest extent. How to obtain the current slicing length according to the modulation mode of the communication link is illustrated with an example in the following.

Packet transmission quality of some certain communication links (such as a microwave air interface) which are sensitive to an external factor changes a lot with a change of whether, terrain, the earth surface and so on, and that a packet is transmitted to a greatest extent may be ensured by using the AMC technology to dynamically adjust a modulation mode of the microwave air interface. When the modulation mode changes, a bandwidth of the microwave air interface changes accordingly. For example, in a 7 M (M) QPSK (Quadrature Phase Shift Keying, quadrature phase shift keying) mode, bandwidth of the microwave air interface is about 10 Mbps; in 7 M and 256 QAM (Quadrature Amplitude Modulation, quadrature amplitude modulation), bandwidth of the microwave air interface is about 40 Mbps; in 56 M and 256 QAM, physical bandwidth of the microwave air interface is about 360 Mbps.

If it is expected to control that a jitter of a sensitive service packet is 50 microseconds, a maximum slicing length in the 7 M (M) QPSK mode should be: (10 Mbps×50 μs)/8=(10.24× $10^6$ bps×50×$10^{-6}$ s)/8=512 bit/8=64 byte (byte). The rest may be deduced by analogy, and slicing lengths in the foregoing three modulation modes need to be controlled to be 64 bytes, 256 bytes, and 2048 bytes, respectively. Taking an insensitive service packet with a length of 9600 bytes as an example, the number of slices in the foregoing three modulation modes are 150 (9600/64), 38 (9600/256), and 5 (9600/2048), respectively. That is to say, if current packet transmission quality of the microwave air interface is better, that is, the bandwidth is higher, a larger slicing length may be chosen, so that the number of slices decreases, thereby reducing an encapsulation overhead of the slice, so that a bandwidth utilization rate can be improved to optimize transmission of the service packet.

While in the prior art, the fixed slicing length is adopted, and therefore, when a slicing length is specified, it needs to be taken into consideration that a slice of the length can also achieve relatively good transmission performance in a case that the packet transmission quality of the communication link is the worst. Therefore, in the foregoing example of the microwave air interface, a slicing length needs to be specified as 64 bytes, while when the packet transmission quality of the communication link is relatively good, 64 bytes is far smaller than 256 bytes, so that compared with a transmission method of adopting a dynamic slicing length, in the transmission method of adopting the fixed slicing length, the bandwidth utilization rate is lower.

In addition, the receiving apparatus and the sending apparatus which are in the mobile communication system may obtain the current slicing length through calculation by adopting the foregoing method and according to the modulation mode of the communication link, where the modulation mode of the communication link is determined by the AMC engine, and therefore, the receiving apparatus and the sending apparatus can synchronously receive a slice of a corresponding length when the slicing length changes.

103. Perform slicing processing once on the insensitive service packet according to the current slicing length to obtain one slice, and send the slice through the communication link.

For example, slicing processing is performed once on the insensitive service packet according to the current slicing length, that is, according to an existing slicing method, a segment of packet which has a same length as the current slicing length is taken out from the insensitive service packet as a slice, and then the slice is sent to the insensitive service packet receiving apparatus through the physical port of the sending apparatus via the communication link.

104. If the current slicing length is smaller than a length of the insensitive service packet, for the remaining part of the insensitive service packet which has undergone the slicing processing once, repeat the step of obtaining the current slicing length according to the modulation mode, and the step of slicing processing and sending the slice, until the insensitive service packet is completely sent.

For example, if the current slicing length is smaller than the length of the insensitive service packet, it indicates that after a part of packet which is is taken out from the insensitive service packet and is used as a slice to be sent, there is a remaining part, and slicing processing needs to be further performed on the remaining part of the insensitive service packet. What is different from the prior art is that before slicing processing is further performed, the current slicing length further needs to be obtained according to the modulation mode of the communication link, where the modulation mode of the communication link reflects the transmission quality of the current packet and is determined by the adaptive coding and modulation engine, to ensure that the service packet is transmitted to a greatest extent.

In this embodiment, a method for slicing the insensitive service packet and then sending the insensitive service packet is adopted, and therefore, when the insensitive service packet and the sensitive service packet are sent mixedly, the jitter of the sensitive service packet can be reduced; when the insensitive service packet is sliced, every time before slicing processing is performed, the modulation mode of the communication link is first obtained, where the modulation mode of the communication link reflects the transmission quality of the current packet and is determined by the adaptive coding and modulation engine, and then the current slicing length is obtained through calculation according to the modulation mode of the communication link, to perform slicing processing on the insensitive service packet according to the current slicing length, thereby ensuring that the service packet is transmitted to a greatest extent, so that the bandwidth utilization rate of the communication link is improved on a precondition that it is ensured to reduce the jitter of the sensitive service packet.

Embodiment 2

Figure 2:
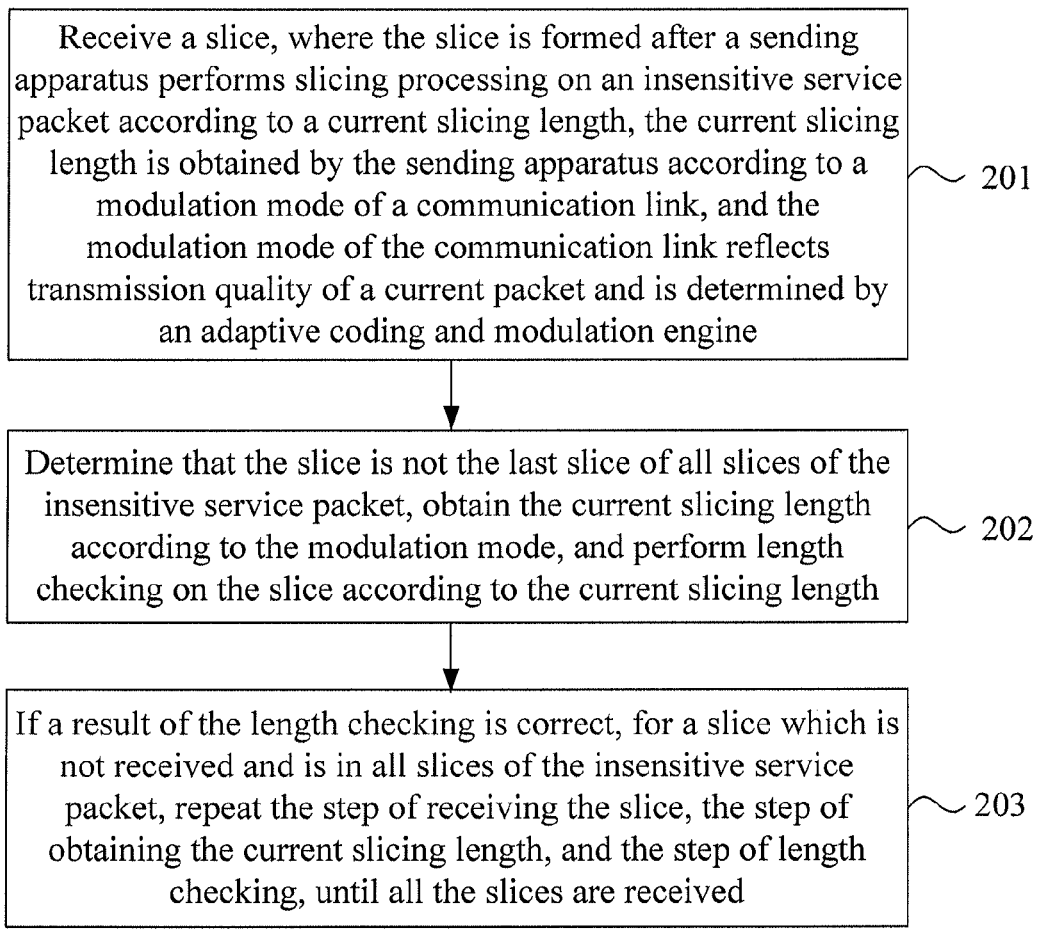
FIG. 2 is a flow chart of a service packet receiving method according to Embodiment 2 of the present disclosure.

This embodiment provides a service packet receiving method. A subject executing the method is a receiving apparatus which has a packet receiving function and is in a communication network, and the receiving apparatus includes a network communication device (such as a layer 2 switch) which is capable of running a data link layer protocol. The method corresponds to the service packet sending method provided in Embodiment 1, to receive a slice sent by performing the method provided in Embodiment 1. As shown in FIG. 2, the method includes the following steps.

201. Receive a slice, where the slice is formed after a sending apparatus performs slicing processing on an insensitive service packet according to a current slicing length, the current slicing length is obtained by the sending apparatus according to a modulation mode of a communication link, and the modulation mode of the communication link reflects transmission quality of a current packet and is determined by an adaptive coding and modulation engine.

As described in Embodiment 1, in the sending apparatus, to prevent jitter influence which is on a sensitive service packet and is caused by sending the insensitive service packet, slicing processing needs to be performed on the insensitive service packet. The current slicing length is obtained through calculation by the sending apparatus according to the modulation mode of the communication link, where the modulation mode of the communication link reflects the transmission quality of the current packet and is determined by the adaptive coding and modulation engine. And then the sending apparatus sends, to the insensitive service packet receiving apparatus, the slice through a physical port via the communication link. The physical port on the receiving apparatus can receive the slice from the communication link.

202. Determine that the slice is not the last slice of all slices of the insensitive service packet, obtain the current slicing length according to the modulation mode, and perform length checking on the slice according to the current slicing length.

For example, according to the description of Embodiment 1, the sending apparatus and the receiving apparatus may obtain the current slicing length through calculation according to the modulation mode of the communication link, where the modulation mode of the communication link is determined by the AMC engine. The last slice of all slices of an insensitive service packet is a tail slice. When the length of the insensitive service packet is smaller than the current slicing length, according to the description of Embodiment 1, the insensitive service packet is sent as a slice, and the slice is also a tail slice. A length of the tail slice is not necessarily equal to the current slicing length, and therefore, checking is not performed on the length of the tail slice in the embodiment.

Length checking is to check whether a length of the slice is equal to the obtained current slicing length, and if the length of the slice is equal to the obtained current slicing length, a result of the checking is correct, which indicates that one slice is successfully received; otherwise, a result of the checking is incorrect, which indicates that there is an error in a received slice, and the receiving apparatus performs further error processing.

203. If a result of the length checking is correct, for a slice which is not received and is in all slices of the insensitive service packet, repeat the step of receiving the slice, the step of obtaining the current slicing length, and the step of length checking, until all the slices are received.

According to the description of Embodiment 1, because a method for slicing the insensitive service packet and then sending the insensitive service packet is adopted, when these slices are received through the communication link in this embodiment, a jitter of a sensitive service packet can also be reduced when the insensitive service packet and the sensitive service packet are sent mixedly. Because the received slices are formed after the sending apparatus performs slicing processing on the insensitive service packet according to the current slicing length, while the current slicing length is obtained through calculation by the sending apparatus according to the modulation mode of the communication link, where the modulation mode of the communication link reflects the transmission quality of the current packet and is determined by the adaptive coding and modulation engine, and therefore, when these slices are received through the communication link, that the service packet is transmitted to a greatest extent can also be ensured, so that a bandwidth utilization rate of the communication link is improved on a precondition that it is ensured to reduce the jitter of the sensitive service packet.

In addition, because every time after a slice except the tail slice is received, length checking is performed on the slice according to a current slicing length used when the slice is formed, which can ensure correct reception of the insensitive service packet.

Embodiment 3

Figure 3:
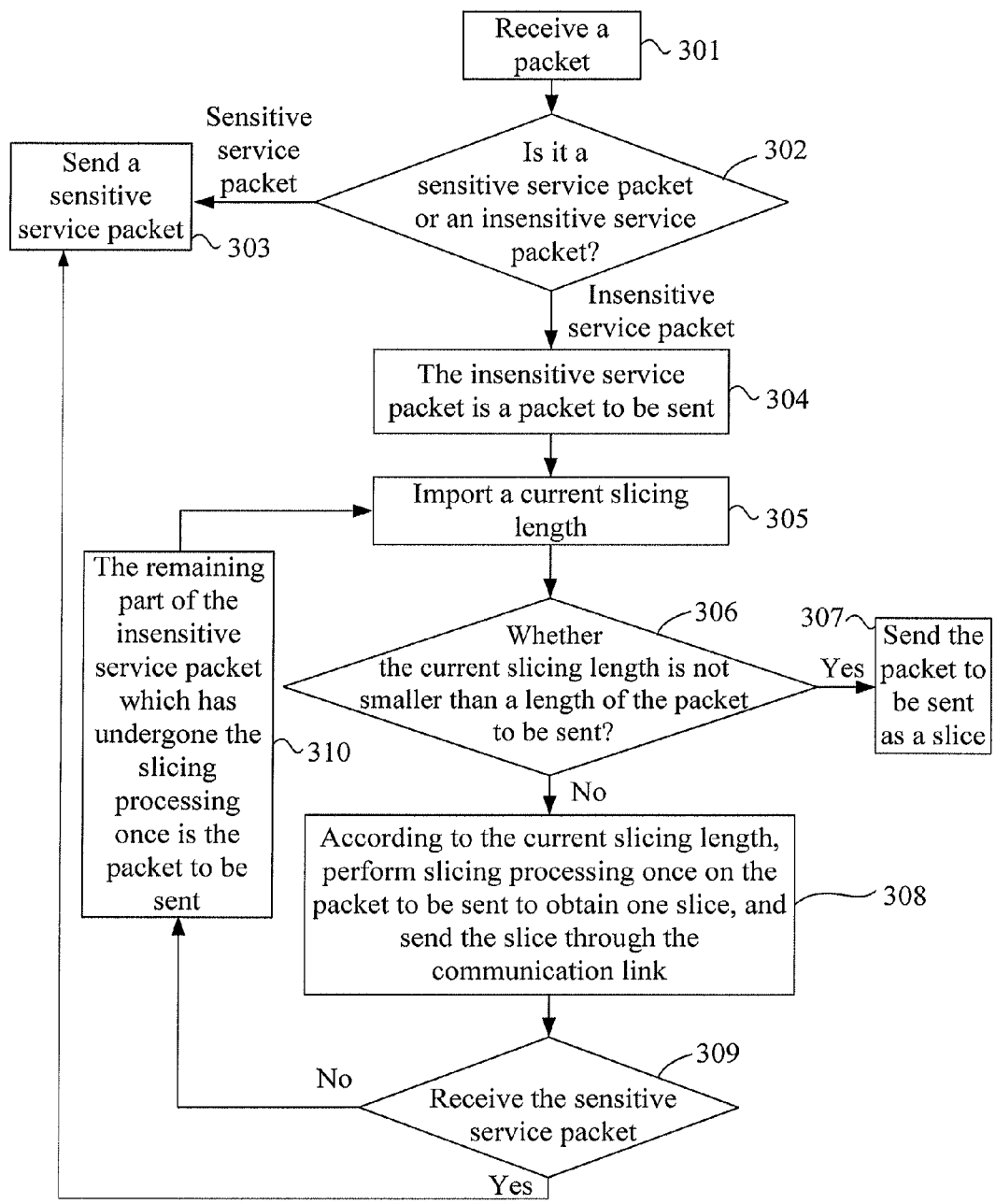
FIG. 3 is a flow chart of a service packet sending method according to Embodiment 3 of the present disclosure.

This embodiment provides a service packet sending method. A subject executing the method is a sending apparatus which has a packet sending function and is in a communication network, and the sending apparatus includes a network communication device (such as a layer 2 switch) which is capable of running a data link layer protocol. As shown in FIG. 3, the method includes the following steps.

301. Receive a packet.

For example, the sending apparatus receives the packet, the packet needs to be sent by the sending apparatus through a communication link to a receiving apparatus, and the packet may be a sensitive service packet, and may also be an insensitive service packet.

302. Determine whether the packet is the sensitive service packet or the insensitive service packet.

303. If the packet is the sensitive service packet, directly send the sensitive service packet through the communication link.

304. If the packet is the insensitive service packet, specify the insensitive service packet as a packet to be sent.

305. Import a current slicing length.

For example, the current slicing length is obtained through calculation by the sending apparatus according to a modulation mode of the communication link, where the modulation mode of the communication link reflects transmission quality of a current packet and is determined by an adaptive coding and modulation engine.

How to obtain the current slicing length through calculation according to the modulation mode of the communication link, where the modulation mode of the communication link is determined by the AMC engine, is described in detail in step 102 of Embodiment 1 and is not repeatedly described here.

306. Determine whether the current slicing length is not smaller than a length of the packet to be sent.

For example, when slicing processing is performed for a first time on the received insensitive service packet, the packet to be sent is the received insensitive service packet, and when slicing processing is performed for an $N^{th}$ (N>2, N is a natural number) time on the received insensitive service packet, the packet to be sent is the remaining part of the received insensitive service packet after slicing processing is performed for an $(N-1)^{th}$ time.

307. If the current slicing length is not smaller than the length of the packet to be sent, send the packet to be sent as a slice.

For example, when the length of the packet to be sent is smaller than the current slicing length, it indicates that the packet to be sent, as a whole, may be sent as a slice. For example, when the packet to be sent is an insensitive service packet which has not undergone slicing processing, the insensitive service packet, as a whole, is sent as a slice; and when the packet to be sent is the remaining part of an insensitive service packet which has undergone slicing processing at least once, the remaining part is the last slice of the insensitive service packet.

308. If the current slicing length is smaller than the length of the packet to be sent, perform slicing processing once on the insensitive service packet according to the current slicing length to obtain one slice, and send the slice through the communication link.

309. Determine whether a sensitive service packet is received; if the sensitive service packet is received, go to step 303.

For example, after one slice is sent, determine whether a sensitive service packet is received, so that the sensitive service packet can be sent in time, thereby reducing jitter occurrence.

310. If the sensitive service packet is not received, use the remaining part of the insensitive service packet which has undergone the slicing processing once as the packet to be sent.

After step 310 is executed, go to step 305, to repeat, for the remaining part of the insensitive service packet which has undergone the slicing processing once, the step of obtaining the current slicing length, the step of slicing processing and sending the slice, and the step of judging whether the sensitive service packet is received, until the insensitive service packet is completely sent.

In this embodiment, a method for slicing the insensitive service packet and then sending the insensitive service packet is adopted, and therefore, when the insensitive service packet and the sensitive service packet are sent mixedly, a jitter of the sensitive service packet can be reduced; when the insensitive service packet is sliced, every time before slicing processing is performed, the modulation mode of the communication link is first obtained, where the modulation mode of the communication link reflects the transmission quality of the current packet and is determined by the adaptive coding and modulation engine, and then the current slicing length is obtained through calculation according to the modulation mode of the communication link, to perform slicing processing on the insensitive service packet according to the current slicing length, thereby ensuring that the service packet is transmitted to a greatest extent, so that a bandwidth utilization rate of the communication link is improved on a precondition that it is ensured to reduce the jitter of the sensitive service packet.

The foregoing communication link may be a microwave communication link, and may also be another communication link which has relatively high requirements for the jitter of the sensitive service packet and the bandwidth utilization rate, such as a link in a frame relay low-speed network.

The slice includes a header indication and slice content. The header indication is added to a header of the slice, to perform link layer encapsulation on the slice content. The slice including the header indication and the slice content is sent through the communication link. The header indication is a binary data segment, and may have a structure shown in FIG. 4, which includes a checking indication crc (a length may be 16 bits), a one-bit type indication type, a one-bit end indication end, and a 14-bit length indication length. The header indication shown in FIG. 4 has 4 bytes, and compared with a 11-byte encapsulation header of MLPPP encapsulation, not only the length is reduced but also no padding byte is used, thereby greatly reducing an encapsulation overhead of the slice, so that the bandwidth utilization rate of the communication link is improved.

Embodiment 4

Figure 5:
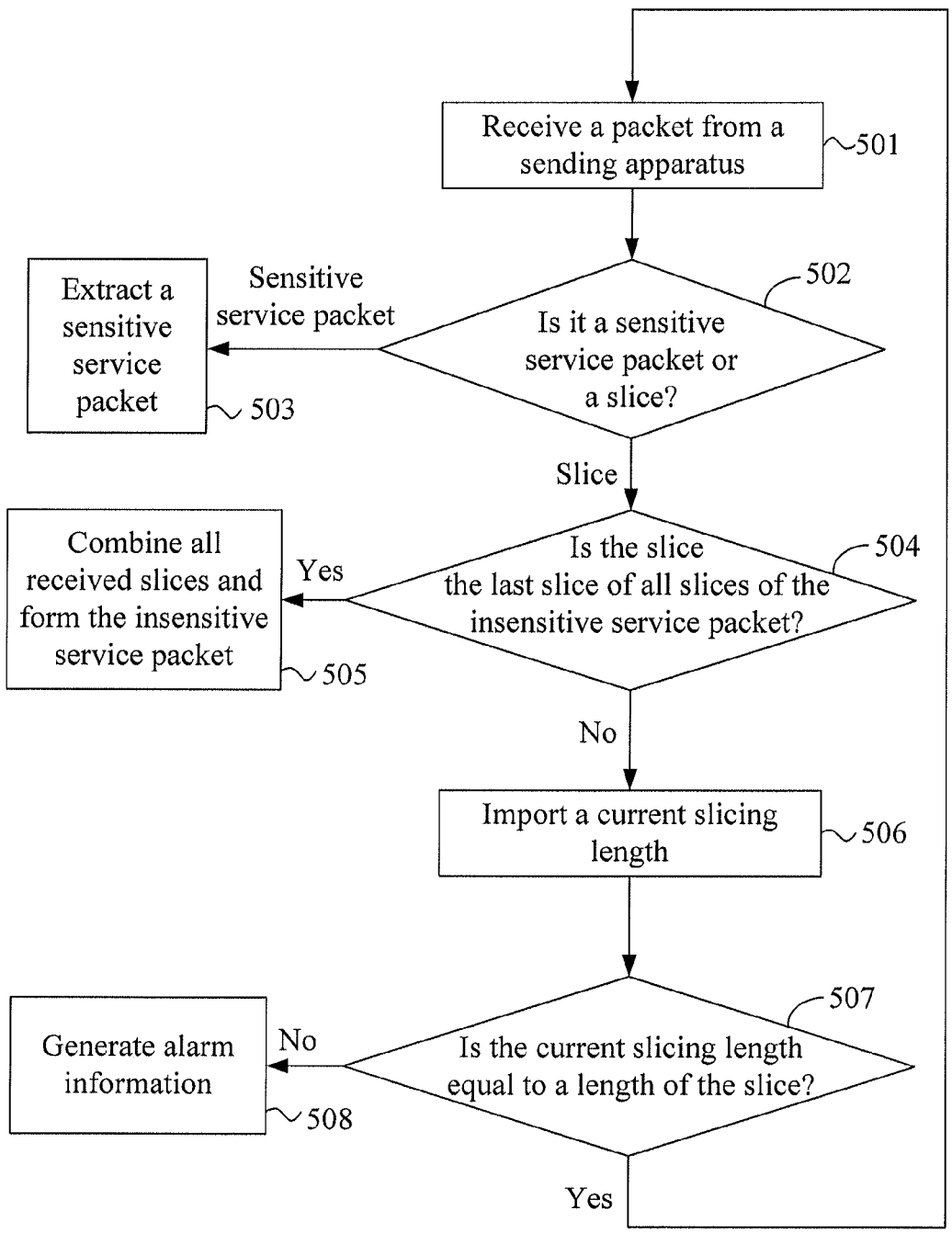
FIG. 5 is a flow chart of a service packet receiving method according to Embodiment 4 of the present disclosure.

This embodiment provides a service packet receiving method. A subject executing the method is a receiving apparatus which has a packet receiving function and is in a communication network, and the receiving apparatus includes a network communication device (such as a layer 2 switch) which is capable of running a data link layer protocol. The method corresponds to the service packet sending method provided in Embodiment 3, to receive a slice and a sensitive service packet which are sent by performing the method provided in Embodiment 3. As shown in FIG. 5, the method includes the following steps.

501. Receive a packet from a sending apparatus.

For example, the packet may be a slice of an insensitive service packet, and may also be a packet header of a sensitive service packet, where the slice is formed after the sending apparatus performs slicing processing on the insensitive service packet according to a current slicing length, the current slicing length is obtained by the sending apparatus according to a modulation mode of a communication link, and the modulation mode of the communication link reflects transmission quality of a current packet and is determined by an adaptive coding and modulation engine.

As described in Embodiment 1, in the sending apparatus, to prevent jitter influence which is on a sensitive service packet and is caused by sending the insensitive service packet, slicing processing needs to be performed on the insensitive service packet. The current slicing length is obtained through calculation by the sending apparatus according to the modulation mode of the communication link, where the modulation mode of the communication link reflects the transmission quality of the current packet and is determined by the adaptive coding and modulation engine. And then the sending apparatus sends, to the insensitive service packet receiving apparatus, the slice through a physical port via the communication link. The physical port on the receiving apparatus can receive the slice from the communication link.

502. Determine whether the received packet is the sensitive service packet or the slice.

503. If the received packet is the sensitive service packet, extract a whole packet according to packet length information carried in the packet. And obtain a data part of the sensitive service packet.

504. If the received packet is the slice, determine whether the slice is the last slice of all slices of the insensitive service packet.

For example, according to the description of Embodiment 2, the last slice of all slices of an insensitive service packet is a tail slice, or is an insensitive service packet with a length smaller than the current slicing length. A length of the tail slice is not necessarily equal to the current slicing length, and therefore, checking is not performed on the length of the tail slice in the embodiment.

505. If the received slice is the tail slice, combine all received slices to form the insensitive service packet.

For example, here "all slices" may refer to multiple slices, while for the insensitive service packet with the length smaller than the current slicing length, "all slices" may refer to one slice.

506. If the received slice is not the tail slice, import the current slicing length.

For example, according to the description of Embodiment 1, the sending apparatus and the receiving apparatus may obtain the current slicing length through calculation according to the modulation mode of the communication link, where the modulation mode of the communication link is determined by the AMC engine.

507. Determine whether the current slicing length is equal to a length of the slice; if the current slicing length is equal to the length of the slice, go to step 501, and if the current slicing length is not equal to the length of the slice, go to step 508.

For example, it is determined whether the current slicing length is equal to the length of the slice, that is, length checking is performed on the slice according to the current slicing length; if the current slicing length is equal to the length of the slice, a result of the checking is correct, which indicates that one slice is successfully received, and then go to step 501, to repeat the step of receiving the slice, the step of obtaining the current slicing length, and the step of length checking, until all slices of the insensitive service packet are received; if the current slicing length is not equal to the length of the slice, a result of the checking is incorrect, which indicates that there is an error in a received slice, and then go to step 508.

508. The receiving apparatus generates alarm information.

The receiving apparatus generates alarm information, to perform further error processing, for example, discarding the insensitive service packet, and reporting an error to a network management device.

According to the description of Embodiment 3, because a method for slicing the insensitive service packet and then sending the insensitive service packet is adopted, when these slices are received through the communication link in the embodiment, a jitter of the sensitive service packet can also be reduced when the insensitive service packet and the sensitive service packet are sent mixedly. Because the received slices are formed after the sending apparatus performs slicing processing on the insensitive service packet according to the current slicing length, while the current slicing length is obtained through calculation by the sending apparatus according to the modulation mode of the communication link, where the modulation mode of the communication link reflects the transmission quality of the current packet and is determined by the adaptive coding and modulation engine, and therefore, when these slices are received through the communication link, that the service packet is transmitted to a greatest extent can also be ensured, so that a bandwidth utilization rate of the communication link is improved on a precondition that it is ensured to reduce the jitter of the sensitive service packet.

In addition, because every time after a slice except the tail slice is received, length checking is performed on the slice according to a current slicing length used when the slice is formed, which can ensure correct reception of the insensitive service packet.

The foregoing communication link may be a microwave communication link, and may also be another communication link which has relatively high requirements for the jitter of the sensitive service packet and the bandwidth utilization rate, such as a link in a frame relay low-speed network.

The slice includes a header indication and slice content, where the header indication is added by the sending apparatus to a header of the slice, and is used to perform link layer encapsulation on the slice content. The header indication is a binary data segment, and may have a structure shown in FIG. 4, which includes a checking indication cyclic redundancy check (CRC) (a length may be 16 bits), a one-bit type indication type, a one-bit end indication end, and a 14-bit length indication length. The header indication shown in FIG. 4 has 4 bytes, and compared with a 11-byte encapsulation header of MLPPP encapsulation, not only the length is reduced but also no padding byte is used, thereby greatly reducing an encapsulation overhead of the slice, so that the bandwidth utilization rate of the communication link is improved.

When the slice adopts the encapsulation structure shown in FIG. 4, by setting the receiving apparatus correspondingly, the receiving apparatus is enabled to identify data of this kind of encapsulation structure, and when the slice is received, a 4-byte header indication and rear slice content are separated from the header of the slice and saved, so as to implement decapsulation of the slice, and then checking is performed on the slice content part by utilizing corresponding bit information in the header indication.

The performing length checking on the slice according to the current slicing length includes: performing length checking on the slice content according to the current slicing length.

Embodiment 5

Figure 6:
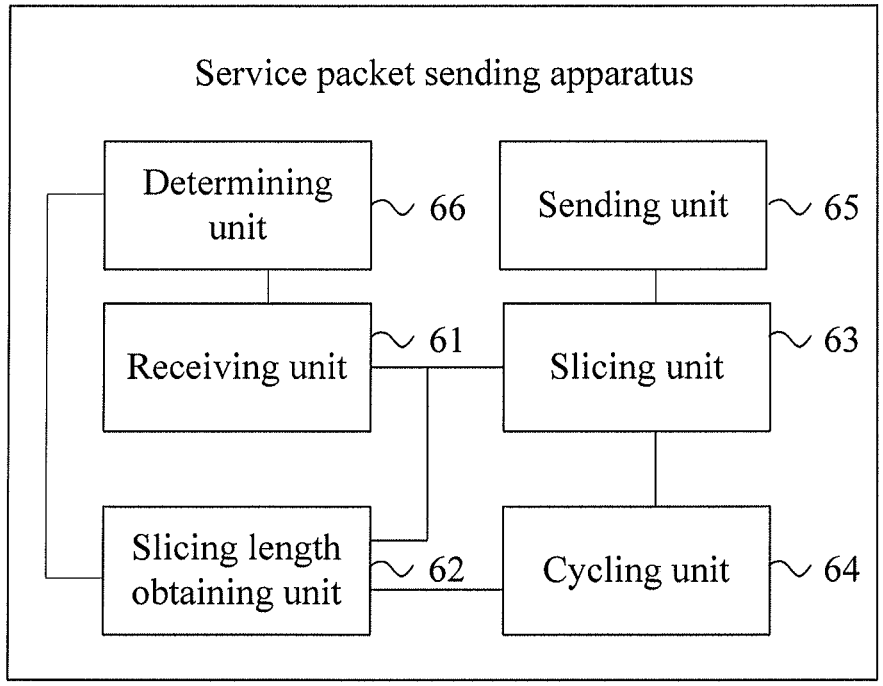
FIG. 6 is a block diagram of a service packet sending apparatus according to Embodiment 5 of the present disclosure.

This embodiment provides a service packet sending apparatus. As shown in FIG. 6, the apparatus includes: a receiving unit 61, configured to receive an insensitive service packet; a slicing length obtaining unit 62, configured to obtain a current slicing length according to a modulation mode of a communication link, where the modulation mode of the communication link reflects transmission quality of a current packet and is determined by an adaptive coding and modulation engine; a slicing unit 63, configured to perform slicing processing once on the insensitive service packet according to the current slicing length to obtain one slice; a sending unit 65, configured to send the slice through the communication link; a determining unit 66, configured to determine whether the current slicing length is smaller than a length of the insensitive service packet; and a cycling unit 64, configured to: when it is determined that the current slicing length is smaller than the length of the insensitive service packet, sequentially send the remaining part of the insensitive service packet which has undergone the slicing processing once in the slicing unit 63, to the slicing length obtaining unit 62, the slicing unit 63, and the sending unit 65, to repeat the step of obtaining the current slicing length, the step of slicing processing, and the step of sending the slice, until the insensitive service packet is completely sent.

The slice includes a header indication and slice content, where the header indication includes a checking indication, a one-bit type indication, a one-bit end indication, and a 14-bit length indication.

The method executed by each of the foregoing units is described in detail in Embodiment 1 and Embodiment 3, which is not repeatedly described here.

In this embodiment, a method for slicing the insensitive service packet and then sending the insensitive service packet is adopted by the slicing unit, and therefore, when the insensitive service packet and a sensitive service packet are sent mixedly, a jitter of the sensitive service packet can be reduced; when the insensitive service packet is sliced, every time before slicing processing is performed, the modulation mode of the communication link is first obtained, where the modulation mode of the communication link reflects the transmission quality of the current packet and is determined by the adaptive coding and modulation engine, and then the current slicing length is obtained through calculation according to the modulation mode, to perform slicing processing on the insensitive service packet according to the current slicing length, thereby ensuring that the service packet is transmitted to a greatest extent, so that a bandwidth utilization rate of the communication link is improved on a precondition that it is ensured to reduce the jitter of the sensitive service packet.

Embodiment 6

Figure 7:
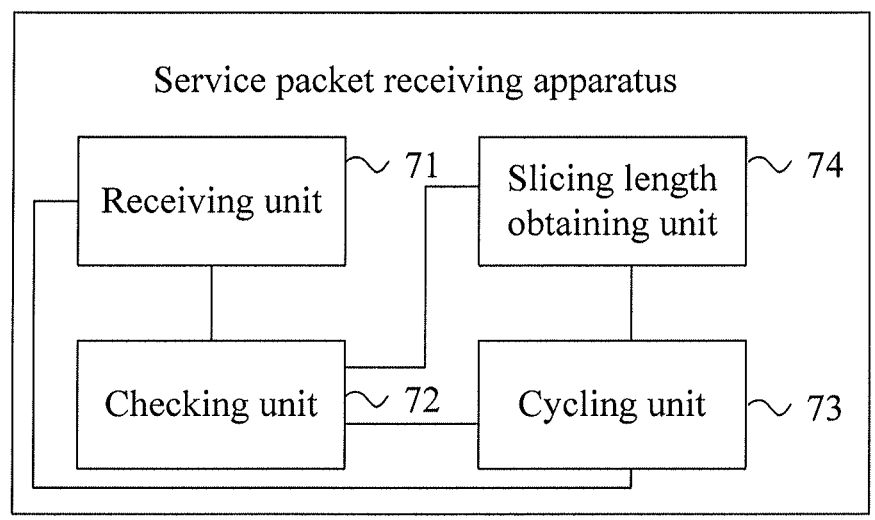
FIG. 7 is a block diagram of a service packet receiving apparatus according to Embodiment 6 of the present disclosure.

This embodiment provides a service packet receiving apparatus. As shown in FIG. 7, the apparatus includes: a receiving unit 71, configured to receive a slice, where the slice is formed after a sending apparatus performs slicing processing on an insensitive service packet according to a current slicing length, the current slicing length is obtained by the sending apparatus according to a modulation mode of a communication link, and the modulation mode of the communication link reflects transmission quality of a current packet and is determined by an adaptive coding and modulation engine; a slicing length obtaining unit 74, configured to determine that the slice is not the last slice of all slices of the insensitive service packet, and obtain the current slicing length according to the modulation mode; a checking unit 72, configured to perform length checking on the slice according to the current slicing length; and a cycling unit 73, configured to: when a result of the length checking is correct, for a slice which is not received and is in all slices of the insensitive service packet, sequentially trigger the receiving unit 71, the slicing length obtaining unit 74, and the checking unit 72, to repeat the step of receiving the slice, the step of obtaining the current slicing length, and the step of length checking, until all the slices are received.

Optionally, the foregoing checking unit 72 includes: a first subunit, configured to determine whether a length of the slice is equal to the current slicing length; a second subunit, configured to: when the first subunit determines that the length of the slice is equal to the current slicing length, output information that the result of the length checking is correct; and a third subunit, configured to: when the first subunit determines that the length of the slice is not equal to the current slicing length, generate and output alarm information.

Optionally, the foregoing slice from the sending apparatus includes: a header indication and slice content; the header indication is used to perform link layer encapsulation on the slice content and includes a checking indication, a one-bit type indication, a one-bit end indication, and a 14-bit length indication.

When the slice includes the header indication and the slice content, the checking unit may further be configured to perform length checking on the slice content according to the current slicing length.

The method executed by each of the foregoing units is described in detail in Embodiment 2 and Embodiment 4, which is not repeatedly described here.

In this embodiment, because a method for slicing the insensitive service packet and then sending the insensitive service packet is adopted by the sending apparatus, when these slices are received through the receiving apparatus, a jitter of a sensitive service packet can also be reduced when the insensitive service packet and the sensitive service packet are sent mixedly. Because the received slices are formed after the sending apparatus performs slicing processing on the insensitive service packet according to the current slicing length, while the current slicing length is obtained through calculation by the sending apparatus according to the modulation mode of the communication link, where the modulation mode of the communication link reflects the transmission quality of the current packet and is determined by the adaptive coding and modulation engine, and therefore, when these slices are received through the receiving unit, that the service packet is transmitted to a greatest extent can also be ensured, so that a bandwidth utilization rate of the communication link is improved on a precondition that it is ensured to reduce the jitter of the sensitive service packet.

In addition, because every time after a slice except the tail slice is received, length checking is performed on the slice according to a current slicing length used when the slice is formed, which can ensure correct reception of the insensitive service packet.

Embodiment 7

Figure 8:
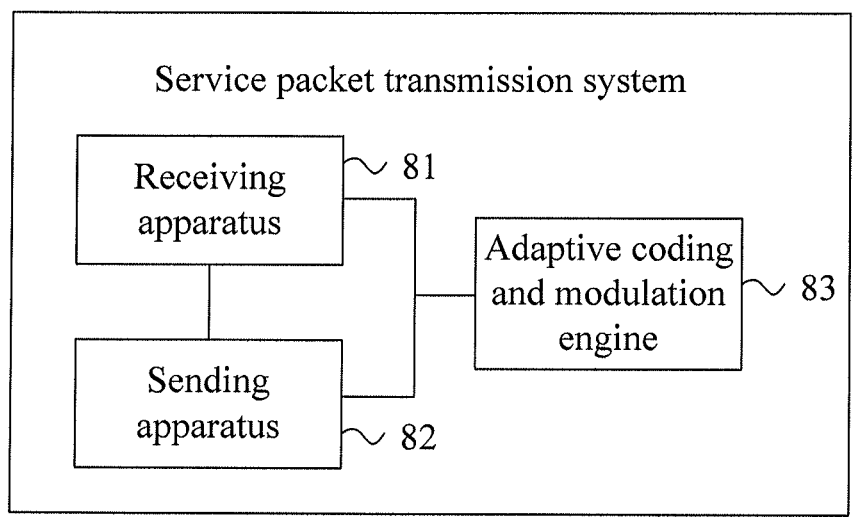
FIG. 8 is a block diagram of a service packet transmission system according to Embodiment 7 of the present disclosure.

This embodiment provides a service packet transmission system. As shown in FIG. 8, the system includes: a sending apparatus 81, a receiving apparatus 82, and an adaptive coding and modulation engine 83.

The adaptive coding and modulation engine 83 is configured to: determine a modulation mode of the communication link according to current state information of a communication link, where the modulation mode of the communication link reflects transmission quality of a current packet; the sending apparatus 81 is configured to receive an insensitive service packet, obtain a current slicing length according to the modulation mode determined by the adaptive coding and modulation engine 83, perform slicing processing once on the insensitive service packet according to the current slicing length to obtain one slice, and send the slice through the communication link; and if the current slicing length is smaller than a length of the insensitive service packet, finally for the remaining part of the insensitive service packet which has undergone the slicing processing once, repeat the step of obtaining the current slicing length, the step of slicing processing, and the step of sending the slice, until the insensitive service packet is completely sent.

The receiving apparatus 82 is configured to receive the slice, determine that the slice is not the last slice of all slices of the insensitive service packet, obtain the current slicing length according to the modulation mode determined by the adaptive coding and modulation engine 83, and perform length checking on the slice according to the current slicing length; and if a result of the length checking is correct, for a slice which is not received and is in all slices of the insensitive service packet, repeat the step of receiving the slice, the step of obtaining the current slicing length, and the step of length checking, until all the slices are received.

Detailed structures of the sending apparatus and the receiving apparatus may be the structures described in Embodiment 5 and Embodiment 6. In addition, the methods executed by the sending apparatus and the receiving apparatus are described in detail in Embodiment 1 to Embodiment 4, which are not repeatedly described here.

In this embodiment, because a method for slicing the insensitive service packet and then sending the insensitive service packet is adopted by the sending apparatus, and the slice can be received by the receiving apparatus through the communication link, and therefore, when the insensitive service packet and a sensitive service packet are sent mixedly, a jitter of the sensitive service packet can be reduced; when the insensitive service packet is sliced, every time before slicing processing is performed, the modulation mode of the communication link is first obtained, where the modulation mode of the communication link reflects the transmission quality of the current packet and is determined by the adaptive coding and modulation engine, and then the current slicing length is obtained through calculation according to the modulation mode, to perform slicing processing on the insensitive service packet according to the current slicing length, thereby ensuring that the service packet is transmitted to a greatest extent, so that a bandwidth utilization rate of the communication link is improved on a precondition that it is ensured to reduce the jitter of the sensitive service packet.

The foregoing descriptions are merely specific embodiments of the present disclosure, but are not intended to limit the protection scope of the present disclosure. Any variation or replacement readily figured out by persons skilled in the art within the scope disclosed in the present disclosure shall fall within the protection scope of the present disclosure. Therefore, the protection scope of the present disclosure shall be subject to the appended claims.

What is claimed is:

1. A method, comprising:
   receiving, by a network device having a processor, an insensitive service packet;
   obtaining, by the network device, a current slicing length according to a modulation mode of a communication link, wherein the modulation mode of the communication link reflects transmission quality of a current packet and is determined by an adaptive coding and modulation engine;
   performing, by the network device, slicing processing once on the insensitive service packet according to the current slicing length to obtain one slice, and sending the slice through the communication link; and
   if the current slicing length is smaller than a length of the insensitive service packet, for the remaining part of the insensitive service packet which has undergone the slicing processing once, repeating the obtaining of the current slicing length, the slicing processing, and the sending the slice, until the insensitive service packet is completely sent,
   wherein the slice comprises a header indication that comprises a checking indication, a one-bit type indication, and a one-bit end indication.

2. The method according to claim 1, wherein the slice comprises the header indication and slice content; the header indication further comprises a 14-bit length indication.

3. The method according to claim 1, wherein the adaptive coding and modulation engine is configured to:
   determine a capacity of a current channel according to channel state information; and
   determine a coding and modulation mode according to the capacity.

4. A network device having a processor connected to a non-transitory memory storage, the non-transitory memory storage is configured to store:
   a receiving unit, configured to receive an insensitive service packet;
   a slicing length obtaining unit, configured to obtain a current slicing length according to a modulation mode of a communication link, wherein the modulation mode of the communication link reflects transmission quality of a current packet and is determined by an adaptive coding and modulation engine;
   a slicing unit, configured to perform slicing processing once on the insensitive service packet according to the current slicing length to obtain one slice;
   a sending unit, configured to send the slice through the communication link;
   a determining unit, configured to determine whether the current slicing length is smaller than a length of the insensitive service packet; and
   a cycling unit, configured to: when it is determined that the current slicing length is smaller than the length of the insensitive service packet, sequentially send the remaining part of the insensitive service packet which has undergone the slicing processing once in the slicing unit to the slicing length obtaining unit, the slicing unit, and the sending unit, to repeat the step of obtaining the current slicing length, the step of slicing processing, and the step of sending the slice, until the insensitive service packet is completely sent,
   wherein the slice comprises a header indication that comprises a checking indication, a one-bit type indication, and a one-bit end indication.

5. The network device according to claim 4, wherein the slice comprises the header indication and slice content; the header indication comprises a 14-bit length indication.

6. The network device according to claim 4, wherein the adaptive coding and modulation engine is configured to:
   determine a capacity of a current channel according to channel state information; and
   determine a coding and modulation mode according to the capacity.

* * * * *